(12) United States Patent
Haselhorst et al.

(10) Patent No.: US 6,300,455 B1
(45) Date of Patent: Oct. 9, 2001

(54) CROSS-LINKABLE MIXTURES AND METHOD FOR PRODUCING SAME

(75) Inventors: Rolf Haselhorst, Leverkusen; Emile Box, Dormagen, both of (DE)

(73) Assignee: GE Bayer Silicones GmbH & Co. KG, Erkrath (DE)

( * ) Notice: Subject to any disclaimer, the term of this patent is extended or adjusted under 35 U.S.C. 154(b) by 0 days.

(21) Appl. No.: 09/319,846

(22) PCT Filed: Dec. 17, 1997

(86) PCT No.: PCT/EP97/07084

§ 371 Date: Aug. 19, 1999

§ 102(e) Date: Aug. 19, 1999

(87) PCT Pub. No.: WO98/29497

PCT Pub. Date: Jul. 9, 1998

(30) Foreign Application Priority Data

Dec. 30, 1996 (DE) .............................................. 196 54 690

(51) Int. Cl.$^7$ ...................................................... C08G 77/08
(52) U.S. Cl. ................... 528/31; 528/15; 528/32; 524/862; 524/710; 524/151
(58) Field of Search ................................. 528/15, 31, 32; 524/862, 710, 151

(56) References Cited

U.S. PATENT DOCUMENTS 5,380,812 * 1/1995 Lutz et al. .............................. 528/15

FOREIGN PATENT DOCUMENTS

761759 * 3/1997 (EP) .

* cited by examiner

Primary Examiner—Margaret G. Moore
(74) Attorney, Agent, or Firm—Norris McLaughlin & Marcus

(57) ABSTRACT

Novel crosslinkable mixtures having improved room temperature stability comprising platinum compounds or an elemental platinum, and at least one sterically complicated substituted triaryl phosphite.

8 Claims, No Drawings

CROSS-LINKABLE MIXTURES AND METHOD FOR PRODUCING SAME

The present invention relates to crosslinkable mixtures and a process for preparing them.

When using addition crosslinking silicone rubber systems, the problem generally arises that the reactive mixture, once prepared, has a finite rate of curing even at room temperature. This can be a nuisance, in particular when the machines have to be shut down for a relatively long time due to technical difficulties or for other reasons. In this case, reactive silicone rubber mixtures left in the machines crosslink even at room temperature which means that very costly cleansing procedures have to be performed before the process can be started up again.

For this reason, there has long been a market need for addition crosslinking silicone rubber systems which ideally do not cure at room temperature at all and have the highest possible rate of reaction under the processing conditions.

In order to achieve this objective, so-called inhibitors are normally added to the rubber systems. One group of inhibitors comprises organophosphorus compounds. Thus, for example, in DE-A-3 635 236, the use of cyclometallised platinum phosphite complexes for increasing the storage-stability at room temperature is described. The catalyst inhibitor complexes mentioned there do increase the pot life at room temperature, but they have the disadvantage that they are complicated to prepare, which is associated with additional production costs. EP-A-662 490 describes general organophosphorus compounds as inhibitors in addition crosslinking silicone systems. The aliphatic and aromatic phosphines mentioned there, however, have the disadvantage that they cause a clear reduction in the rate of reaction under the processing conditions (T=120 to 170° C.). DE-P 19532316.5 describes crosslinkable addition crosslinking mixtures which contain, in addition to a hydrosilylation catalyst, an organophosphorus compound and an inhibitor. The adjustment described there, using a 2-component system, however, is complicated. Mixtures which are fully inhibited at room temperature and in which there is no effect on the rate of reaction under the conditions of curing with an additive, have not hitherto been disclosed.

There is therefore the object of providing suitable mixtures for lowering the activity of the catalyst at room temperature, even in rapid, addition crosslinking silicone systems, without extending the curing times under the reaction conditions.

In addition, the mixture should be as simple as possible, i.e. it should comprise the smallest possible number of components.

It has now been found, that the problems in addition crosslinking polysiloxane mixtures can be solved if these contain Pt compounds or elemental Pt or any other hydrosilylation catalysing substance and at least one sterically complicated substituted triaryl phosphite of the type described in more detail below. The mode of action of the organophosphorus compound as inhibitor becomes closer to that of an ideal inhibitor (switch function, threshold characteristic) the more sterically complicated is the aromatic group R.

The invention therefore provides crosslinkable mixtures containing the following components a) at least one polysiloxane, which contains at least two olefinically or acetylenically unsaturated multiple bonds, b) at least one polyhydrogensiloxane, which contains at least two hydrogen atoms bonded directly to the silicon atom, c) at least one substance for catalysing the hydrosilylation, d) at least one phosphorus compound of the general formula (I): $P(OR)_3$ where $R=C_7-C_{31}$ -alkylaryl, wherein R may have different definitions within one molecule, and e) optionally further auxiliary substances.

Component a) in the context of the invention is preferably a cyclic, linear or branched polysiloxane which is built up from units of the general formula (II)

$$(R^3)_a(R^4)_b SiO_{(4-a-b)/2} \quad (II)$$

Here, $R^3$ represents a $C_2-C_8$-alkenyl radical, e.g. vinyl, allyl, 1-butenyl, 1-hexenyl etc. The alkenyl radicals may be bonded to silicon atoms within the chain or right at the end. $R^4$ is a monovalent, saturated hydrocarbon radical with up to 10 carbon atoms from the group of substituted and unsubstituted alkyl, aryl, and arylalkyl radicals. Examples of these monovalent radicals $R^4$ are methyl, ethyl, propyl, isopropyl, butyl, octyl, etc., cyclobutyl, cyclopentyl, cyclohexyl etc., phenyl, tolyl xylyl naphthyl, etc., benzyl, phenylethyl, phenylpropyl. The following conditions are placed on the integers a and b: $0 \leq a \leq 3$ and $0 \leq b \leq 3$ and $0 \leq a+b \leq 4$. The number a is preferably 0 or 1. In the radicals $R^4$ in the present invention, some or all of the hydrogen atoms may be substituted by fluorine and/or chlorine, bromine, or iodine atoms or cyano groups. This means that $R^4$ may also represent, for example, a chloromethyl, trifluoropropyl, chlorophenyl, dibromophenyl, cyanoethyl, cyanopropyl or cyanopropyl radical.

Using nomenclature which is familiar to a person skilled in the art:

$M:(CH_3)_3SiO_{1/2}$ $D:(CH_3)_2SiO_{2/2}$ $T:(CH_3)SiO_{3/2}$ $M^{Vi}:(CH_2=CH)(CH_3)_2SiO_{1/2}$ $D^{Vi}:(CH_2=CH)(CH_3)SiO_{2/2}$ the following may be cited as examples of component a):

$M_2D_{100}D_3^{Vi}$ $M_2^{Vi}D_{180}$ $M^{Vi}MD_{100}D_3^{Vi}$ $T_5D_{550}M_7^{Vi}$ $T_3D_{500}M_2^{Vi}M_3$ $T_6D_{300}D^{Vi}M_4^{Vi}M_4$ $M_2^{Vi}D_{1500}$ $M_2^{Vi}D_{4000}D_{50}^{Vi}$ and $M_2D_{2000}D_5^{Vi}$ The molar proportion of unsaturated radicals of the type $R^3$ may be chosen to have any value.

The molar proportion of unsaturated radicals of the type $R^3$ in component a) should preferably be between $10^{-3}$ and 10 mmol per gram. The expression 'between' always includes the particular limiting values cited, both here and in the text which follows. The viscosity of component a) is preferably between $10^{-3}$ and 1.000.000 Pa.s at 25° C.

Component b) in the context of the present invention is a polysiloxane which is built up from units of the general formula (III)

$$H_c(R^4)_d SiO_{(4-c-d)/2} \quad (III)$$

wherein $R^4$ is defined in the same way as above and $R^4$ may optionally also be defined in the same way as $R^3$. The stoichiometric indices c and d are integers where $0 \leq d \leq 3$ and $0 \leq c \leq 2$ and $0 \leq c+d \leq 4$. Preferably, $0 \leq c \leq 1$.

Using nomenclature which is familiar to a person skilled in the art

Q: $SiO_{4/2}$ $M^H$: $H(CH_3)_2SiO_{1/2}$ $D^H$: $H(CH_3)SiO_{2/2}$ the following may be cited as examples of component b):

$M_2^H D_{10}$, $M_2 D_{10} D_{10}^H$, $M_2^H D_{20} D_{10}^H$, $M_2^{Vi} D_{11}^H$, $M_2 D_3^{Vi} D_8^H$, and $QM_{1,3-1,8}^H D_{0,1}$, (M, D, $M^{Vi}$ and $D^{Vi}$ are defined in the same way as for component a)).

The molar proportion of hydrogen atoms directly bonded to a silicon atom in component b) may be chosen to have any value at all.

In component b), the molar proportion of hydrogen atoms directly bonded to a silicon atom is preferably between 0.01 and 17 mmol, more preferably between 0.1 and 17 mmol and in particular is between 1 and 17 mmol per gram of component b).

In the overall mixture described, components a) and b) are preferably present in a ratio by amounts such that the molar ratio of hydrogen atoms directly bonded to a silicon atom (SiH) in component b) to unsaturated radicals (Si-vinyl) in component a) is preferably between 0.05 and 20, more preferably between 0.5 and 10 and in particular between 1 and 5.

Component c) in the context of the invention preferably includes the elements platinum, rhodium, iridium, nickel ruthenium and/or palladium, as the element on a support substance or in the form of their compounds. Platinum compounds or platinum complexes such as, for example, $H_2PtCl_6$, platinum/olefin complexes, platinum/alcoholate complexes, platinum/vinylsiloxane complexes or also elemental platinum on a support substance such as e.g. activated carbon, $Al_2O_3$ or $SiO_2$ are preferred. Component c) is, in particular, a platinum/vinylsiloxane complex. Platinum/vinylsiloxane complexes preferably contain at least 2 olefinically unsaturated double bonds in the siloxane, see e.g. U.S. Pat. No. 3 715 334.

The expression siloxane also includes polysiloxanes, i.e. for example also vinylpoly-siloxanes. The proportion of component c) in the overall mixture is preferably between 1 and 1000 ppm, more preferably between 1 and 500 ppm and in particular between 1 and 100 ppm.

Component d) in the context of the invention is an organophosphorus compound of the type $P(OR)_3$. R may represent different entities within one molecule.

A compound of the following formula is preferred:

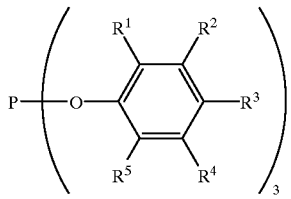

where $R^1, R^2, R^3, R^4, R^5$ =H, $C_nH_{2n+1}$ and n=1–15, $C_aH_{2a-1}$ and a=3–15 and/or —$C_nF_{2n+1}$, wherein $R^1, R^2, R^3, R^4$ and $R^5$ may be identical or different and not all of the radicals $R^1, R^2, R^3, R^4$ and $R^5$ represent H.

The aliphatic radicals mentioned may be linear or branched, the H atoms contained therein may optionally be substituted by groups such as —$NH_2$, —COOH, —F, —Br, —Cl, —CN, —$C_6H_5$, —$C_6H_4(CH_3)$.

Sterically complicated radicals in the context of the invention are also substituted or unsubstituted heteroaromatic compounds as well as substituted or unsubstituted polyaromatic compounds as well as polyaromatic compounds containing heteroatoms.

Component d) in the present invention is preferably added in an amount by weight of 1 ppm to 50 000 ppm, with reference to the total weight of mixture, more preferably 10 ppm to 10 000 ppm and in particular between 20 ppm and 2000 ppm.

Components d) can be prepared, for example, by the processes described in Methoden der organ. Chemie, Houben-Weil, vol. XII/2, 1964, 4th ed. p. 59–61.

Auxiliary substances (component e) in the context of the invention are, for example, polysiloxane resins which are built up from fundamental units of the general formula (II) and (III), fillers which have a positive effect on the mechanical and electrical properties of the cured mixture in accordance with the invention such as, for example, pyrogenic and precipitated silicas with a BET surface area of 50 to 500 $m^2g$. These types of fillers may be surface-modified, for example with organosilicon compounds. Modification may also be achieved during incorporation into the polymer by adding, for example, α, ω-OH terminally stopped oligosiloxanes or polysiloxanes or hexa-methyldisilazane or 1,3-divinyl-1,1,3,3-tetramethyldisilazane while adding water.

Furthermore, substances such as, for example, diatomaceous earths, finely divided quartz powder, amorphous silica or carbon black, as well as $Al(OH)_3$ or oxides which can be ceramicised, etc., may be used as fillers.

In another embodiment, mixtures according to the invention also contain water or an organic solvent.

In a preferred embodiment of the invention, components a) and b) are preferably present in a ratio by weight such that:

the ratio SiH:Si-vinyl is between 0.1 and 10, the concentration of component c) is between 1 and 1000 ppm, the concentration of component d) is between 0.0001 and 5%, wherein data referring to amounts are each with reference to the total weight of the mixture.

This invention also provides a process for preparing crosslinkable mixtures according to the invention. In this, components a) and d) are preferably mixed and then component c) and finally component b) are added. It is also possible to mix components a) and d) and add component b) and lateron component c). The addition of component c) ensures (apart from the composition) that the rate of reaction is reduced.

The invention also provides use of phosphorus compounds of the formula I as an inhibitor and the use of a mixture of at least one phosphorus compound of the formula I and a Pt compound or elemental Pt to control the rate of crosslinking in addition crosslinking silicone systems.

The following examples are used to explain the invention. The invention is not, however, restricted to the examples.

WORKING EXAMPLE

In the following examples, all data relating to weight and percentages, unless stated otherwise, are with reference to the weight of the entire mixture.

The compounds used can be defined as follows:

| Name | Chemical composition | Viscosity | Si-Vi concentration | Si-H concentration |
|---|---|---|---|---|
| Polysiloxane A | $M^{V1}_2D_n$ | 1000 Pa s | 0.005 mmol g$^{-1}$ | — |
| Polysiloxane B | $M_2D_nD^{V1}_m$ | 1150 Pa s | 0.024 mmol g$^{-1}$ | — |
| Polysiloxane C | $M_2D_nD^H_m$ | 35 mPa s | — | 4.3 mmol g$^{-1}$ |
| Polysiloxane D | $M^{V1}_2D_n$ | 10 Pa s | 0.05 mmol g$^{-1}$ | — |

The basic mixture used consists of:
55 wt. % of polysiloxane A,
19 wt. % of polysiloxane B and
26 wt.% of surface-modified pyrogenic silica.
The inhibitor mix used is composed as follows:
99.915 wt. % of basic mixture and
0.085 wt. % of an organophosphorus compound of the type P(OR)$_3$ and
the catalyst mix used consists of:
99.88 wt.% of polysiloxane D and 0.22 wt. % of Pt (in the form of a vinylsiloxane complex)

EXAMPLE 1

The amounts of inhibitor mix and catalyst mix specified below were added to the parts of basic mixture given in Table 1. The amount of catalyst mix was selected so that the concentration of metallic Pt in all the mixtures was 10 ppm, with reference to the weight of the entire mixture. The amount of inhibitor mix was selected so that the molar ratio of organophosphorus compound to Pt complex was 2:1 in all the mixtures.

Finally, 1.3 g of polysiloxane C were added. The molar ratio of vinyl groups directly bonded to Si atoms to H atoms directly bonded to Si atoms was 1:2.5 in all the mixtures.

TABLE 1

Amounts used, given as parts by wt.

| Initial amount weighed out | R = phenyl | R = 4-tert.-butyl-phenyl | R = 2,4-ditert.-butylphenyl |
|---|---|---|---|
| Basic mixture | 95.6 | 93.5 | 9.2 |
| Inhibitor mix | 4.2 | 6.5 | 8.8 |
| Catalyst mix | 0.5 | 0.5 | 0.5 |

All the mixtures had a pot life of more than four weeks at room temperature.

Cure-meter curves were plotted for each of these mixtures at temperature T=140 °C. and the t$_{60}$-times were determined.

Table 2 gives the chemical structure of R in the organophosphorus compound of the type P(OR)$_3$ and also gives the t$_{60}$-time at T =140 °C.

TABLE 2

| R = | t$_{60}$-time at T = 140° C. |
|---|---|
| phenyl | 19.73 |
| 4-tert.-butylphenyl | 9.69 |
| 2,4-di-tert.-butylphenyl | 1.22 |

The systems are faster the more sterically complicated is the radical R in the organophosphorus compound of the type P(OR)$_3$.

What is claimed:

1. Crosslinkable mixture, storable in the presence of ambient air and containing the following components:

a) at least one polysiloxane, which contains at least two olefinically or acetylenically unsaturated multiple bonds, b) at least one polyhydrogensiloxane, which contains at least two hydrogen atoms bonded directly to the silicon atom, c) at least one metal complex for catalyzing hydrosilyation, d) at least one phosphorus compound of the general formula P(OR)$_3$ where R=C$_9$C$_{31}$-alkylaryl, wherein R may have different definitions within one molecule, and e) optionally water, other further auxiliary substances or a combination thereof.

2. Crosslinkable mixture according to claim 1, wherein component c) is a Pt compound, a platinum complex or elemental platinum on a support substance.

3. Crosslinkable mixture according to claim 1, wherein component c) is a platinum/vinylsiloxane complex in which the siloxane contains at least two olefinically unsaturated double bonds.

4. Crosslinkable mixture according to claim 1, wherein component d) is a compound of the formula:

$$\left( P - O - \begin{array}{c} R^1 \quad R^2 \\ \phantom{X} \\ R^5 \quad R^4 \end{array} R^3 \right)_3$$

where

R$^1$, R$^2$, R$^3$, R$^4$, R$^5$ are each selected from the group consisting of H, C$_n$H$_{2n+}$ where n=3–15, C$_a$H$_{2a-1}$ where a=3–15, and C$_n$F$_{2n+1}$, wherein R$^1$, R$^2$, R$^3$, R$^4$ and R$^5$ are identical or different and not all of the radicals R$^1$, R$^2$, R$^3$, R$^4$ and R$^5$ represent H.

5. Crosslinkable mixture according to claim 4, wherein at least one of R$^1$, R$^2$, R$^3$, R$^4$ and R$^5$ is a tertiary alkyl group.

6. Crosslinkable mixture according claim 1, further comprising an organic solvent.

7. Crosslinkable mixture according to claim 1, wherein components a) and b) are present in a ratio by weight such that the ratio SiH:Si-vinyl is between 0.01 and 300, the concentration of component c) is between 0.1 and 1000 ppm, the concentration of component d) is 0.0001% to 5%, in each case with reference to the total weight of the mixture.

8. Process for preparing the crosslinkable mixture of claim 1, wherein components a) and d) are mixed, then component c) and finally component b) are added.

* * * * *

UNITED STATES PATENT AND TRADEMARK OFFICE
CERTIFICATE OF CORRECTION

PATENT NO. : 6,300,455 B1
DATED : October 9, 2001
INVENTOR(S) : Haselhorst et al.

It is certified that error appears in the above-identified patent and that said Letters Patent is hereby corrected as shown below:

Column 6,
Line 45, "$C_nH_{2n+}$" should read -- $C_nH_{2n+1}$ --

Signed and Sealed this

Twenty-sixth Day of July, 2005

JON W. DUDAS
*Director of the United States Patent and Trademark Office*